United States Patent Office 3,542,858
Patented Nov. 24, 1970

---

3,542,858
METHOD FOR PREPARING 2,6-DICHLORO-4-NITROBENZOIC ACID AND INTERMEDIATE THEREFOR
Dennis M. Mulvey, Iselin, and Peter I. Pollak, Scotch Plains, N.J., assignors to Merck & Co., Inc., Rahway, N.J., a corporation of New Jersey
No Drawing. Filed Dec. 14, 1967, Ser. No. 690,377
Int. Cl. C07c 79/40
U.S. Cl. 260—515                                5 Claims

ABSTRACT OF THE DISCLOSURE 2,6-dichloro-4-nitro-1,3-benzene dicarboxylic acid is prepared by the oxidation of 2,6-dichloro-4-nitro-m-xylene which is selectively decarboxylated to 2,6-dichloro-4-nitrobenzoic acid by heat or treatment with nitric acid. These acids are intermediates in the preparation of 2,6-dichloro-4-nitrobenzamide, a compound having anticoccidial activity.

BACKGROUND OF THE INVENTION

Field of the invention

A method for preparing 2,6-dichloro-4-nitrobenzoic acid from 2,6-dichloro-4-nitro-1,3-benzene dicarboxylic acid.

SUMMARY OF THE INVENTION

An object of the present invention is to provide a novel method for the preparation of 2,6-dichloro-4-nitrobenzoic acid.

The unique method consists of preparing and of selectively decarboxylating 2,6-dichloro-4-nitro-1,3-benzene dicarboxylic acid.

The 2,6-dichloro-4-nitrobenzoic acid prepared according to this invention is useful as an intermediate in making 2,6-dichloro-4-nitrobenzamide, a compound having anticoccidial properties.

This invention relates to a novel method of preparing 2,6-dichloro-4-nitrobenzoic acid. The 2,6-dichloro-4-nitrobenzoic acid of this invention is prepared from 2,6-dichloro-4-nitro-m-xylene, by reacting the 2,6-dichloro-4-nitro-m-xylene with an oxidizing agent such as potassium permanganate or nitric acid to yield the novel 2,6-dichloro-4-nitro-1,3-benzene dicarboxylic acid. This acid is then selectively decarboxylated at elevated temperatures of about 200–300° C. in either aqueous nitric acid or a high boiling inert solvent such as nitrobenzene, dibenzylether, dodecylbenzene, quinoline, and the like to yield 2,6-dichloro-4-nitrobenzoic acid.

This reaction sequence may be represented as follows:

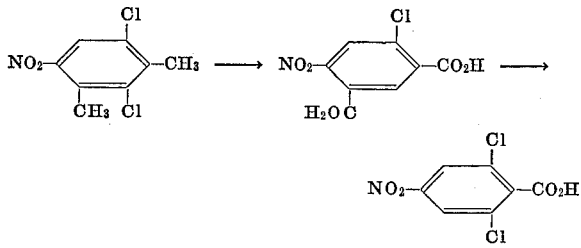

The 2,6-dichloro-4-nitrobenzoic acid may also be prepared directly from 2,6-dichloro-4-nitro-m-xylene. This is accomplished by heating 2,6-dichloro-4-nitro-m-xylene in aqueous nitric acid above 200° C.

In the first step of the synthesis, 2,6-dichloro-4-nitro-m-xylene is oxidized to the diacid by reacting it with a suitable oxidizing agent, such as potassium permanganate in a suitable solvent, such as aqueous pyridine, aqueous α-picoline, aqueous acetone, and the like or chromium trioxide in a suitable solvent such as sulfuric acid. When the oxidizing agent is potassium permanganate the reaction mixture is heated for one to two hours at temperatures of from about 30–100° C. It is convenient and preferred to carry out the reaction at the reflux temperature of the solvent. The 2,6-dichloro-4-nitro-1,3-benzene dicarboxylic acid is recovered by known techniques, and exists as a solid having a melting point of 224–227° C.

When aqueous nitric acid is the oxidizing agent, the same procedure is followed.

The 2,6-dichloro-4-nitro-1,3-benzene dicarboxylic acid is then selectively decarboxylated to yield 2,6-dichloro-4-nitrobenzoic acid.

The selective decarboxylation method comprises two methods. One method consists of reacting 2,6-dichloro-4-nitro-1,3-benzene dicarboxylic acid with aqueous nitric acid above 200° C. from ½ to 1½ hours. The other method consists of refluxing the diacid with a suitable inert solvent for one to two hours at a temperature above 200° C.

The 2,6-dichloro-4-nitrobenzoic acid can be used to prepare 2,6-dichloro-4-nitrobenzamide by known means.

EXAMPLE 1

2,6-dichloro-4-nitrobenzoic acid

In a one liter three-necked round bottom flask equipped with a stirrer and thermometer is placed 25.0 gm. (0.098 m.) of 2,6-dichloro-4-nitro-m-xylene. 98 grams of pyridine and 100 grams of water are then added. The resulting solution is warmed to 90° C. 110 grams of potassium permanganate is slowly added over a one-hour period to the rapidly stirred solution while keeping the temperature around 90° C. At the end of the addition, the solution is refluxed for one hour and then filtered immediately. The aqueous solution is extracted with chloroform to remove any unreacted 2,6-dichloro-4-m-xylene. The aqueous solution is cooled to 5° C., acidified with 6 N hydrochloric acid and extracted with chloroform (2× 100 ml.) to remove any of the unwanted mixed toluic acids. Finally, the aqueous phase is extracted with ethyl acetate (4× 100 ml.), dried over magnesium sulfate and evaporated to give 10.19 gm. (37%) of 2,6-dichloro-4-nitro-1,3-benzene dicarboxylic acid, M.P. 203–219° C. After recrystallization from ethyl acetate/hexane, the 2,6-dichloro-4-nitro-1,3-benzene dicarboxylic acid melts at 224–227° C. with effervescence.

EXAMPLE 2

2,6-dichloro-4-nitrobenzoic acid 7.5 ml. of nitrobenzene is added to 1.45 gm. of 2,6-dichloro-4-nitro-1,3-benzene dicarboxylic acid (0.005 m.) and the resulting solution refluxed, with stirring, for 75 minutes. After cooling and adding 25 ml. of n-hexane the solution is extracted with 5% aqueous potassium bicarbonate (3× 10 ml.). The aqueous bicarbonate solution is acidified with concentrated hydrochloric acid and extracted with chloroform (3× 20 ml.). The chloroform solution is dried over magnesium sulfate and evaporated to yield 1.0 gm. of 2,6-dichloro-4-nitrobenzoic acid, having a M.P. of 153–162° C. Crystallization from water yields the pure 2,6-dichloro-4-nitrobenzoic acid, M.P. 169–170° C.

EXAMPLE 3

2,6-dichloro-4-nitrobenzoic acid 14.2 grams of concentrated nitric acid (sp. gr. 1.42) is diluted with 60 gm. of water and added to 5.0 gm. of 2,6-dichloro-4-nitro-1,3-benzene dicarboxylic acid (0.017 m.). The resulting solution is heated above 200° C. for ⅔ hour. The solution is cooled, made basic with sodium carbonate and extracted with ether (2× 20 ml.) to remove any neutral material. The aqueous portion is acidified and extracted with ether (3× 30 ml.). The ether solution is dried over magnesium sulfate and evaporated to yield 2.9 gm. of crude 2,6-dichloro-4-nitrobenzoic acid. Crystallization from water yields the pure 2,6-dichloro-4-nitrobenzoic acid, M.P. 169–170° C.

EXAMPLE 4

2,6-dichloro-4-nitrobenzoic acid

A mixture of 4 gm. of water, 2.84 gm. of concentrated nitric acid (specific gravity 1.42) and 1.0 gm. of 2,6-dichloro-4-nitro-m-xylene (0.0045 m.) is heated above 200° C. for one hour. The solution is cooled, diluted with 25 ml. of water and extracted with ethyl acetate (3× 50 ml.). The ethyl acetate solution is washed with 5% aqueous potassium bicarbonate (3× 50 ml.). The potassium bicarbonate solution is acidified and extracted with chloroform (6× 25 ml.). The chloroform solution is dried over magnesium sulfate and evaporated to yield 0.45 gm. of crude 2,6-dichloro-4-nitrobenzoic acid, which has a melting point of 169–170° C. after crystallization from water.

What is claimed is:
1. 2,6-dichloro-4-nitro-1,3-benzene dicarboxylic acid.
2. The process for preparing 2,6-dichloro-4-nitrobenzoic acid which comprises treating 2,6-dichloro-4-nitro-1,3-benzene dicarboxylic acid with aqueous nitric acid at elevated temperatures.
3. The process for preparing 2,6-dichloro-4-nitrobenzoic acid which comprises treating 2,6-dichloro-4-nitro-1,3-benzene dicarboxylic acid with a high boiling solvent at elevated temperatures.
4. The process of claim 3, wherein the high boiling solvent is nitrobenzene.
5. The process for preparing 2,6-dichloro-4-nitrobenzoic acid which comprises treating 2,6-dichloro-4-nitro-m-xylene with nitric acid at elevated temperatures.

References Cited

UNITED STATES PATENTS

| 2,228,920 | 1/1941 | Eckert et al. | 260—524 |
| 3,037,054 | 5/1962 | Di Bella | 260—524 |

FOREIGN PATENTS

| 960,246 | 6/1964 | Great Britain. |
| 1,116,208 | 11/1961 | Germany. |

JAMES A. PATTEN, Primary Examiner

U.S. Cl. X.R.

260—524